United States Patent
Song

(10) Patent No.: US 10,406,503 B2
(45) Date of Patent: *Sep. 10, 2019

(54) POROUS, WET-TRIGGERED SHRINKABLE MATERIALS

(71) Applicant: Kimberly-Clark Worldwide, Inc., Neenah, WI (US)

(72) Inventor: Xuedong Song, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 35 days.

This patent is subject to a terminal disclaimer.

(21) Appl. No.: 15/564,766

(22) PCT Filed: Oct. 25, 2016

(86) PCT No.: PCT/US2016/058561
§ 371 (c)(1),
(2) Date: Oct. 6, 2017

(87) PCT Pub. No.: WO2018/080434
PCT Pub. Date: May 3, 2018

(65) Prior Publication Data
US 2019/0091655 A1    Mar. 28, 2019

(51) Int. Cl.
*B01J 20/26* (2006.01)
*C08L 33/26* (2006.01)
(Continued)

(52) U.S. Cl.
CPC ............ *B01J 20/267* (2013.01); *B01J 20/24* (2013.01); *B01J 20/28023* (2013.01);
(Continued)

(58) Field of Classification Search
CPC .............. B01J 20/267; B01J 20/3007; B01J 20/28023; B01J 20/28033; B01J 20/24; B01J 20/305
See application file for complete search history.

(56) References Cited

U.S. PATENT DOCUMENTS 4,357,938 A    11/1982 Ito et al.
4,447,240 A     5/1984 Ito et al.
(Continued)

FOREIGN PATENT DOCUMENTS

CN    101608006 B    4/2011
CN    101891946 B    7/2012
(Continued)

OTHER PUBLICATIONS

Omidian, H. et al., "Elastic, Superporous Hydrogel Hybrids of Polyacrylamide and Sodium Alginate," Macromolecular Bioscience, vol. 6, No. 9, 2006, pp. 703-710.
(Continued)

*Primary Examiner* — Liam J Heincer
*Assistant Examiner* — Andrew J. Oyer
(74) *Attorney, Agent, or Firm* — Kimberly-Clark Worldwide, Inc.

(57) ABSTRACT

A substrate includes a double-network polymer system including a cross-linked, covalently-bonded polymer and a reversible, partially ionicly-bonded polymer, wherein the substrate has a moisture level less than or equal to 15 percent of the total weight of the substrate, wherein the substrate is porous, and wherein the substrate includes a latent retractive force. A method for manufacturing a substrate includes producing a double-network hydrogel including a cross-linked, covalently-bonded polymer and a reversible, ionicly-bonded polymer; elongating by force the double-network hydrogel in at least one direction; treating the double-network hydrogel with an organic solvent with a volatile and water-miscible organic solvent to replace a majority of water within the double-network hydrogel; evaporating the organic solvent while the double-network hydrogel is still elongated to form a substantially-dried double-network
(Continued)

polymer system; and releasing the force to produce the substrate.

9 Claims, 1 Drawing Sheet

(51) Int. Cl.
    *B01J 20/30*    (2006.01)
    *B01J 20/28*    (2006.01)
    *B01J 20/24*    (2006.01)

(52) U.S. Cl.
    CPC ....... *B01J 20/28033* (2013.01); *B01J 20/305* (2013.01); *B01J 20/3007* (2013.01); *C08L 33/26* (2013.01)

(56) References Cited

U.S. PATENT DOCUMENTS

| | | | |
|---|---|---|---|
| 4,942,089 | A | 7/1990 | Genba et al. |
| 6,030,634 | A | 2/2000 | Wu et al. |
| 6,605,349 | B2 | 8/2003 | Phillips |
| 6,960,617 | B2 | 11/2005 | Omidian et al. |
| 8,563,027 | B2 | 10/2013 | Jarrett et al. |
| 8,828,434 | B2 | 9/2014 | Su et al. |
| 8,916,683 | B2 | 12/2014 | Olsen et al. |
| 2010/0174021 | A1 | 7/2010 | Huie, Jr. et al. |
| 2010/0210752 | A1 | 8/2010 | Muratoglu et al. |
| 2012/0232502 | A1 | 9/2012 | Lowing |
| 2014/0296425 | A1 | 10/2014 | Tew et al. |
| 2015/0038613 | A1* | 2/2015 | Sun .......................... A61L 27/52 523/113 |

FOREIGN PATENT DOCUMENTS

| | | |
|---|---|---|
| CN | 102226007 B | 9/2012 |
| CN | 102827333 A | 12/2012 |
| EP | 2026063 A1 | 2/2009 |
| JP | 2005/526879 A | 9/2005 |
| KR | 10-2002-0073553 A | 9/2002 |
| WO | WO 2006/132661 A1 | 12/2006 |
| WO | WO 2014/169119 A1 | 10/2014 |
| WO | WO 2014/176304 A1 | 10/2014 |

OTHER PUBLICATIONS

Sun, Jeong-Yun et al., "Highly Stretchable and Tough Hydrogels," Nature, Macmillan Publishers, vol. 489, Sep. 6, 2012, pp. 133-136.
Machine translation of JP 2005-526879 A to Munro et al., dated Sep. 8, 2005, 45 pages.
Co-pending U.S. Appl. No. 15/561,595, filed Sep. 26, 2017, by Xuedong Song for "Materials That Shrink in One Dimension and Expand in Another Dimension."

* cited by examiner

POROUS, WET-TRIGGERED SHRINKABLE MATERIALS

BACKGROUND

The present disclosure is generally directed to absorbent and shrinkable materials. In particular, the present disclosure is directed to materials that shrink in one dimension and expand in another dimension when absorbing a liquid such as water or a bodily fluid.

Responsive materials that can potentially address many unmet consumer needs associated with existing products are needed. New applications of those responsive materials can also stimulate exploration and development of emerging products beyond current categories.

Related materials can include water shrinkable fibers; however, they are not hydrogels, they do not shrink to the same magnitude, and they do not possess elastic properties after liquid-triggered shrinking. Previous attempts at producing responsive materials include materials such as those described in U.S. Pat. No. 4,942,089 to Genba et al. related to shrinking fiber, water-absorbing shrinkable yarn, and other similar materials. Shrinking fibers that are hardly soluble in water and that are capable of shrinking in water at 20° C. by not less than 30% in not longer than 10 seconds are obtained, for example, by spinning, drawing, and heat-treating a carboxy-modified polyvinyl alcohol under specific conditions. Yarns made from a fiber of this kind in conjunction with nonwoven fabrics made by incorporating yarns containing such shrinking fibers in nonwoven fabrics that are shrinkable upon absorption of water have been proposed for tightly fitting edge portions of disposable diapers to the thigh.

Although capable of absorbing fluids, conventional hydrogels are generally soft and fragile in a hydrated state and brittle and hard in a dried or dehydrated state. Conventional hydrogels have poor mechanical properties with poor stretchability and notch-resistance.

In addition, U.S. Patent Application Publication No. 2015/038613 to Sun et al. describes a hydrogel composition, but does not disclose drying/dehydrating such a composition under stress. PCT Patent Application Publication No. WO06132661 to Muratoglu et al. describes a hydrogel that is made "tougher" by dehydrating the hydrogel after "deforming" the hydrogel using compressive force.

As a result, there is a need to enable production of a nonwoven with the attributes described herein.

SUMMARY

Unmet needs for existing products include conformance, comfort, and the elimination of leakage. Disclosed herein is a new type of responsive materials in different forms that can simultaneously shrink in one dimension and expand in one or more other dimensions upon contact with aqueous media and body fluids to form hydrogel materials. The materials also have significant absorbing capacity for water and other aqueous liquids. The materials are flexible in string, fiber, or film form.

Recently a new class of hydrogels, double-networked hydrogels, has been developed with very interesting mechanical properties such as high elasticity, toughness, and notch-resistance in hydrated state. Those materials can be used to address unmet needs in many different fields.

This disclosure describes a substrate including a double-network polymer system including a cross-linked, covalently-bonded polymer and a reversible, partially ionically-bonded polymer, wherein the substrate has a moisture level less than or equal to 15 percent of the total weight of the substrate, wherein the substrate is porous, and wherein the substrate includes a latent retractive force.

In an alternate aspect, a method for manufacturing a substrate includes producing a double-network hydrogel including a cross-linked, covalently-bonded polymer and a reversible, ionicly-bonded polymer; elongating by force the double-network hydrogel in at least one direction; treating the double-network hydrogel with an organic solvent with a volatile and water-miscible organic solvent to replace a majority of water within the double-network hydrogel; evaporating the organic solvent while the double-network hydrogel is still elongated to form a substantially-dried double-network polymer system; and releasing the force to produce the substrate.

Objects and advantages of the disclosure are set forth below in the following description, or can be learned through practice of the disclosure.

BRIEF DESCRIPTION OF THE DRAWINGS

The present disclosure will be more fully understood, and further features will become apparent, when reference is made to the following detailed description and the accompanying drawings. The drawings are merely representative and are not intended to limit the scope of the claims.

Figure 1:
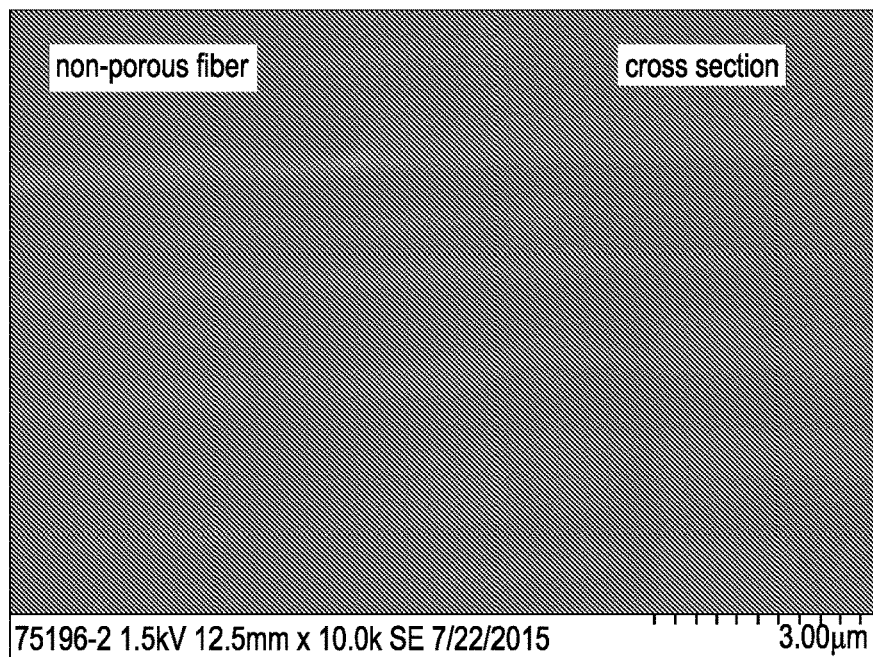
FIG. 1 is an SEM photographic illustration of a cross-section of a non-porous material as described herein.

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

As used herein, the terms "elastomeric" and "elastic" are used interchangeably and shall mean a layer, material, laminate or composite that is generally capable of recovering its shape after deformation when the deforming force is removed. Specifically, when used herein, "elastic" or "elastomeric" is meant to be that property of any material that, upon application of a biasing force, permits the material to be stretchable to a stretched biased length that is at least about fifty (50) percent greater than its relaxed unbiased length, and that will cause the material to recover at least forty (40) percent of its elongation upon release of the stretching force. A hypothetical example that would satisfy this definition of an elastomeric material would be a one (1) inch sample of a material that is elongatable to at least 1.50 inches and that, upon being elongated to 1.50 inches and released, will recover to a length of less than 1.30 inches. Many elastic materials can be stretched by much more than fifty (50) percent of their relaxed length, and many of these will recover to substantially their original relaxed length upon release of the stretching force.

Reference now will be made in detail to various aspects of the disclosure, one or more examples of which are set forth below. Each example is provided by way of explanation, not of limitation of the disclosure. In fact, it will be apparent to those skilled in the art that various modifications and variations can be made in the present disclosure without departing from the scope or spirit of the disclosure. For instance, features illustrated or described as part of one aspect, can be used on another aspect to yield a still further aspect. Thus it is intended that the present disclosure cover such modifications and variations.

This disclosure describes a modification of a double-network hydrogel. A double-network hydrogel is a hydrogel that includes two types of polymers. In this case, one is a permanently cross-linked/covalently-bonded polymer; the second is a polymer with reversible cross-linkers such as ions-ligand-based cross-linkers (the ionicly-bonded polymer). Double-network hydrogels have been reported to have superior mechanical properties such as strength, elasticity, and notch-resistance. (See, e.g., Nature, Vol. 489, p133, 2012).

The double-network hydrogel of this disclosure is modified by stretching/stressing the double-network hydrogel while it is wet and then, while maintaining such stretching, drying it to lower than about a 10-15% moisture level. The resultant product material, a double-network polymer system that is not a hydrogel, remains strong and flexible when dry, but is not elastic. The cross-linked polymer of the double-network polymer system provides strength, whereas the ionicly-bonded polymer has had some of its bonds broken. Without being limited with respect to theory, it is believed that breaking these bonds during drying creates stored energy in the form of a latent retractive force in the dry double-network polymer system.

In a typical hydrogel, re-hydration leads to expansion in all three dimensions. Again, without being limited with respect to theory, it is believed that when the dry double-network polymer system of this disclosure is re-hydrated, some of the broken ionic bonds are re-formed. The double-network polymer system shrinks in one dimension (e.g., in the x-y plane), while it expands in another dimension (e.g., the z-direction, where the z-direction is perpendicular to the x-y plane). For example, a string-like sample of dry double-network polymer system demonstrated shrinkage in length from about 5 inches to 1 inch when re-hydrated, while the sample also expanded in diameter. A disk-shaped sample of the dry double-network polymer system shrank in diameter but increased in thickness.

Previous attempts to make wet-triggered shrinkable materials that become elastic after being hydrated used processes that are relatively cumbersome. Moreover, in general, the materials will not start to shrink until a couple of minutes after wetting when all the dimensions of the materials are more than 100 micrometers. In some cases, this time scale might not be a problem. The response speed, however, might not be fast enough in other cases such as tightening of gaps to prevent leakage in absorbent articles. An improved version of wet-triggered shrinkable materials is disclosed herein, where the materials include a large number of micro- and nano-pores in the wet-triggered shrinkable materials that become elastic upon hydration. In addition, a simplified process of making nonporous and porous wet-triggered shrinkable materials is also disclosed. The porous wet-triggered shrinkable materials include double-networked polymers and start to shrink and complete the shrinking process much faster than non-porous counterparts of the same dimension and general material description.

Conventional hydrogels are generally soft and fragile in their hydrated state and brittle and hard in a dried state. Conventional hydrogels have poor mechanical properties along with poor stretchability and notch-resistance. Recently a new class of hydrogels, double-networked hydrogels, has been developed with very interesting mechanical properties such as high elasticity, toughness, and notch-resistance when in a hydrated state. In this disclosure, porous wet-triggered shrinkable double-networked hydrogel materials are disclosed that respond to wetting much faster than nonporous counterparts. In addition, a simplified process has been developed to make the porous shrinkable materials.

In various aspects of the disclosure, a string, strand, sheet, or a fiber in a dry state (with less than 10-15% water content) contains a large number of pores. The pores can be in various sizes from micrometers to nanometers. The pores can be open or closed, although open pores are preferred.

The materials absorb water or water-containing liquid to shrink at least in one direction and swell at least in another dimension. Upon absorbing water or water-containing liquid, the materials become elastic hydrogels. In addition, the strings, strands, sheets, or fibers absorb at least four times their weight in water. For instance, in the case of a string made from the double-network polymer system, the string's length becomes much shorter when wetted than it was in the original dry state when no external force is applied, whereas the diameter of the string becomes larger at the same time upon wetting. In another example, a sheet made from the double-network polymer system can shrink in length and width upon wetting or hydrating while its thickness increases at the same time.

The cross-linked polymer can be polyacrylamide, polyacrylic acid, any other suitable polymer, or any combination of these. The reversible cross-linker can be alginate with calcium ions, gelatin with aluminum ions, any other suitable polymer, or any combination of these. In a dry state, calcium ions are not significantly cross-linked with alginate.

In one specific aspect, such a material is made of at least one cross-linked hydrogel forming polymer and at least another hydrogel forming polymer with reversible cross-linker(s) in which a significant portion of the cross-linkers (e.g., 30%) are not fully cross-linked and in a free or partially free state with the polymer in a dry state. One example of the cross-linked polymer is polyacrylamide. Another example of the cross-linked polymers is polyacrylic acid. One example of the polymers with reversible cross-linkers is alginate with calcium ions. Another example of the reversible cross-linked polymers is gelatin with aluminum ions. In a dry state, a significant portion of calcium ions is not cross-linked with alginate.

Previously-reported processes to make the base materials include the use of ultraviolet (UV) light for polymerization, cross-linking and curing after mixing all the components in a container. This process sometimes produces materials that are fragile and are easy to tear. Presumably, UV light can damage some of the materials during polymerization and curing process. The improved process employed herein uses self-generated heat to accelerate polymerization and curing for making the materials without using UV light irradiation. The materials produced using this improved process are more consistent in terms of strength and shrinking performance. By placing all the ingredients under vacuum to remove oxygen, polymerization starts to generate heat that helps to accelerate polymerization, cross-linking, and curing. Unlike the previously-used process, this improved process does not need an extended period of curing to obtain sufficiently-performing materials.

This new disclosure is an improved version that contains a large number of micro- and nano-pores. This new version starts to shrink much faster (example starts to shrink 8 times faster) and completes the shrinking process much faster (example finishes shrinking 3 times faster).

Potential applications of the double-network polymer system include embedding the dry double-network polymer systems in personal care products, absorbent medical products, and wipers in various string lengths or shapes. The dry double-network polymer system in a product will change shape or tighten when wetted, potentially leading to a change in shape or appearance of such products. The positions of the embedded porous materials can vary depending upon the specific needs. The embedding methods can vary as well. Specific embedding methods include adhesives-based, ultrasound-based, hot-melting-based or mechanical bonding techniques such as sewing or needle-punching. Examples of the absorbent articles include diapers, feminine pads and liners, incontinent garments.

As described further in the examples below, the present disclosure includes manufacturing the double-networked polymer system substrates. First, the double-networked hydrogels are manufactured in a hydrated state consistent with reported literature. The double-network hydrogels can be manufactured in a string, a strand, a sheet, a fiber, or in any other suitable form. After curing the double-network hydrogels, the double-network hydrogels are mechanically stretched or elongated in one or two selected dimensions. The stretched materials are placed in a water-miscible volatile organic solvent such as ethanol, methanol, tetrahydrofuran, acetone, or butanone for a period of time until the material becomes white or opaque. The materials are taken out of the solvent and dried to generate porous wet-triggered shrinkable materials. When the elongation force is released, the dried materials (double-network polymer systems) keep the dimensions they acquired under elongation without significant changes for a long period of time under ambient conditions.

While not shown, it can be desirable to use finishing steps and/or post treatment processes to impart selected properties to the dry double-network polymer system. For example, chemical post treatments can be added to the double-network polymer system at a later step, or the double-network polymer system can be transported to cutters, slitters, or other processing equipment for converting the double-network polymer system into a final product. Further, patterning can be placed through known processes into the outer surfaces of the double-network polymer system.

For the purposes of this disclosure, samples of double-network hydrogels were made using polyacrylamide as the cross-linked polymer and calcium alginate as the ionicly-bonded polymer. Additional detail with respect to the preparation and performance of such double-network hydrogels can be found in U.S. Patent Application Publication No. 2015/038613 to Sun et al., which is incorporated herein by reference to the extent it does not conflict herewith.

EXAMPLES

Materials and Procedures

1. Preparation of double network hydrogel. In one vial, 0.6 g of alginate sodium was dissolved in 10 ml water. In another vial, 3.4 g of acrylamide was dissolved in 12.5 ml of water. The two solutions were combined. Then 2 mg of N,N'-Methylenebisacrylamide (MBAA) and 34 mg of ammonium persulfate, dissolved in 2 ml of water, were added. The solution was vacuumed for 15 minutes. 8.5 mg of tetramethyl ethylenediamine was dissolved in 1 ml water and was added to the vacuumed solution and mixed well. The solution was then poured into a petri dish containing 80 mg of calcium sulfate slurry in 400 microliter of water and mixed. The petri dish was placed under vacuum for one hour. The hydrogel was elastic and could be easily stretched 20 times of its original length without breaking. The stretch and relaxation could be repeated more than 50 times.

2. Preparation of water-triggered shrinkable strings. The hydrogel piece prepared in step 1 above was cut into small strings. The strings were stretched to about 6 times their original lengths and then air-dried. The air-dried strings remained stable and were flexible for bending and manipulation without breaking. The dry strings shrank into lengths close to their original hydrated state within a couple of minutes upon wetting with water or urine. For instance, a thin shrinkable string of 12 cm long became relatively fat hydrogel of 2 cm long. In comparison, polyvinyl alcohol-based shrinkable fibers of similar size shrank less than 50% and they shrank slower.

3. Preparation of porous wet-triggered shrinkable strings. The hydrogel piece prepared in step 1 above was cut into small strings. The strings were stretched to about 6 times their original lengths and were placed into ethanol. The transparent strings gradually became opaque and then white after about ten minutes. The white strings were taken out of ethanol and air-dried or heat-dried. The porous strings remained stable and flexible for bending and manipulation without breaking. The dry porous string shrank into a length close to its original hydrated state within less than one minute upon wetting with water or urine. For instance, a thin shrinkable string of 12 cm long became relatively fat hydrogel of 2 cm long.

Figure 2:
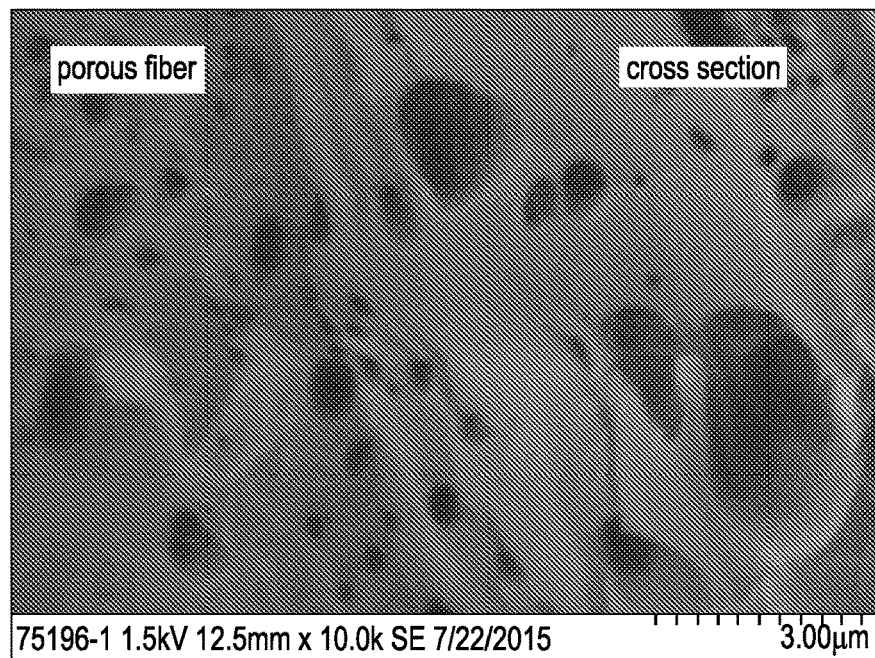
FIG. 2 is an SEM photographic illustration of a cross-section of a porous material as described herein.

4. Comparison for structure of porous and non-porous wet-triggered shrinkable materials. Porous and non-porous wet-triggered shrinkable strings were made from the same batch of base hydrogel materials with the same diameter and length. The porous strings were white and opaque and the non-porous strings were transparent. Cross-section SEM images of porous strings showed a large number of pores of micrometer and nanometer sizes while the nonporous fibers did not show any pores in their cross-sections (See FIGS. 1 and 2).

5. Comparison of shrinking kinetics. When the porous and non-porous shrinkable strings of the same dimension were placed into water, the porous shrinkable strings started to shrink much faster and complete the shrinking process to the relaxation state faster than their non-porous counterparts. For instance, a porous wet-triggered shrinkable string of 8 cm length with a weight of 20 mg started to shrink at 15 seconds after placed into water and completed the shrinking process to about 2 cm long elastic hydrogel around 1.5 minutes after in water. In contrast, a non-porous wet-triggered shrinkable string of 8 cm length with a weight of 20 mg started to shrink at around 2 minutes after placed into water and completed the shrinking process to about 2 cm long elastic hydrogel around 4.5 minutes after in water.

In a first particular aspect, a substrate includes a double-network polymer system including a cross-linked, covalently-bonded polymer and a reversible, partially ionicly-bonded polymer, wherein the substrate has a moisture level less than or equal to 15 percent of the total weight of the substrate, wherein the substrate is porous, and wherein the substrate includes a latent retractive force.

A second particular aspect includes the first particular aspect, wherein the substrate is liquid absorbent.

A third particular aspect includes the first and/or second aspect, wherein the cross-linked, covalently-bonded polymer is polyacrylamide.

A fourth particular aspect includes one or more of aspects 1-3, wherein the reversible, partially ionicly-bonded polymer is calcium alginate.

A fifth particular aspect includes one or more of aspects 1-4, wherein the substrate is flexible and inelastic.

A sixth particular aspect includes one or more of aspects 1-5, wherein the substrate is configured to release the retractive force when exposed to aqueous liquid.

A seventh particular aspect includes one or more of aspects 1-6, wherein the release of the retractive force results in the substrate shrinking in at least one dimension.

An eighth particular aspect includes one or more of aspects 1-7, wherein the release of the retractive force results in the substrate expanding in at least one dimension that is different from the shrinking dimension.

A ninth particular aspect includes one or more of aspects 1-8, wherein the double-network polymer system is configured to become a double-network hydrogel when exposed to aqueous liquid.

In a tenth particular aspect, a method for manufacturing a substrate includes producing a double-network hydrogel including a cross-linked, covalently-bonded polymer and a reversible, ionicly-bonded polymer; elongating by force the double-network hydrogel in at least one direction; treating the double-network hydrogel with an organic solvent with a volatile and water-miscible organic solvent to replace a majority of water within the double-network hydrogel; evaporating the organic solvent while the double-network hydrogel is still elongated to form a substantially-dried double-network polymer system; and releasing the force to produce the substrate.

An eleventh particular aspect includes the tenth particular aspect, wherein the organic solvent is ethanol.

A twelfth particular aspect includes the tenth and/or eleventh aspects, wherein elongating and evaporating captures a latent retractive force in the substrate.

A thirteenth particular aspect includes one or more of aspects 10-12, wherein the substrate is configured to release the retractive force when exposed to liquid.

A fourteenth particular aspect includes one or more of aspects 10-13, wherein the release of the retractive force results in the substrate shrinking in at least one dimension.

A fifteenth particular aspect includes one or more of aspects 10-14, wherein the release of the retractive force results in the substrate expanding in at least one dimension that is different from the shrinking dimension.

A sixteenth particular aspect includes one or more of aspects 10-15, wherein the cross-linked, covalently-bonded polymer is polyacrylamide.

A seventeenth particular aspect includes one or more of aspects 10-16, wherein the reversible, ionicly-bonded polymer is calcium alginate.

An eighteenth particular aspect includes one or more of aspects 10-17, wherein the double-network hydrogel is elastic, and wherein the substrate is flexible and inelastic.

A nineteenth particular aspect includes one or more of aspects 10-18, wherein the double-network polymer system is configured to return to a double-network hydrogel when exposed to aqueous liquid.

A twentieth particular aspect includes one or more of aspects 10-19, wherein the substrate is in the form of a web, a string, a disk, a sheet, or a fiber.

While the disclosure has been described in detail with respect to the specific aspects thereof, it will be appreciated that those skilled in the art, upon attaining an understanding of the foregoing, can readily conceive of alterations to, variations of, and equivalents to these aspects. Accordingly, the scope of the present disclosure should be assessed as that of the appended claims and any equivalents thereto.

What is claimed is:

1. A substrate comprising a double-network polymer system including a cross-linked, covalently-bonded polymer and a reversible, partially ionicly-bonded polymer, wherein the substrate has a moisture level less than or equal to 15 percent of the total weight of the substrate, wherein the substrate is porous, and wherein the substrate comprises a latent retractive force.

2. The substrate of claim 1, wherein the substrate is liquid absorbent.

3. The substrate of claim 1, wherein the cross-linked, covalently-bonded polymer is polyacrylamide.

4. The substrate of claim 1, wherein the reversible, partially ionicly-bonded polymer is calcium alginate.

5. The substrate of claim 1, wherein the substrate is flexible and inelastic.

6. The substrate of claim 1, wherein the substrate is configured to release the retractive force when exposed to aqueous liquid.

7. The substrate of claim 6, wherein the release of the retractive force results in the substrate shrinking in at least one dimension.

8. The substrate of claim 7, wherein the release of the retractive force results in the substrate expanding in at least one dimension that is different from the shrinking dimension.

9. The substrate of claim 1, wherein the double-network polymer system is configured to become a double-network hydrogel when exposed to aqueous liquid.

* * * * *